H. C. CALHOUN.
EXPANDER FOR WHEELS.
APPLICATION FILED SEPT. 20, 1916.
1,226,638.
Patented May 22, 1917.
2 SHEETS—SHEET 1.
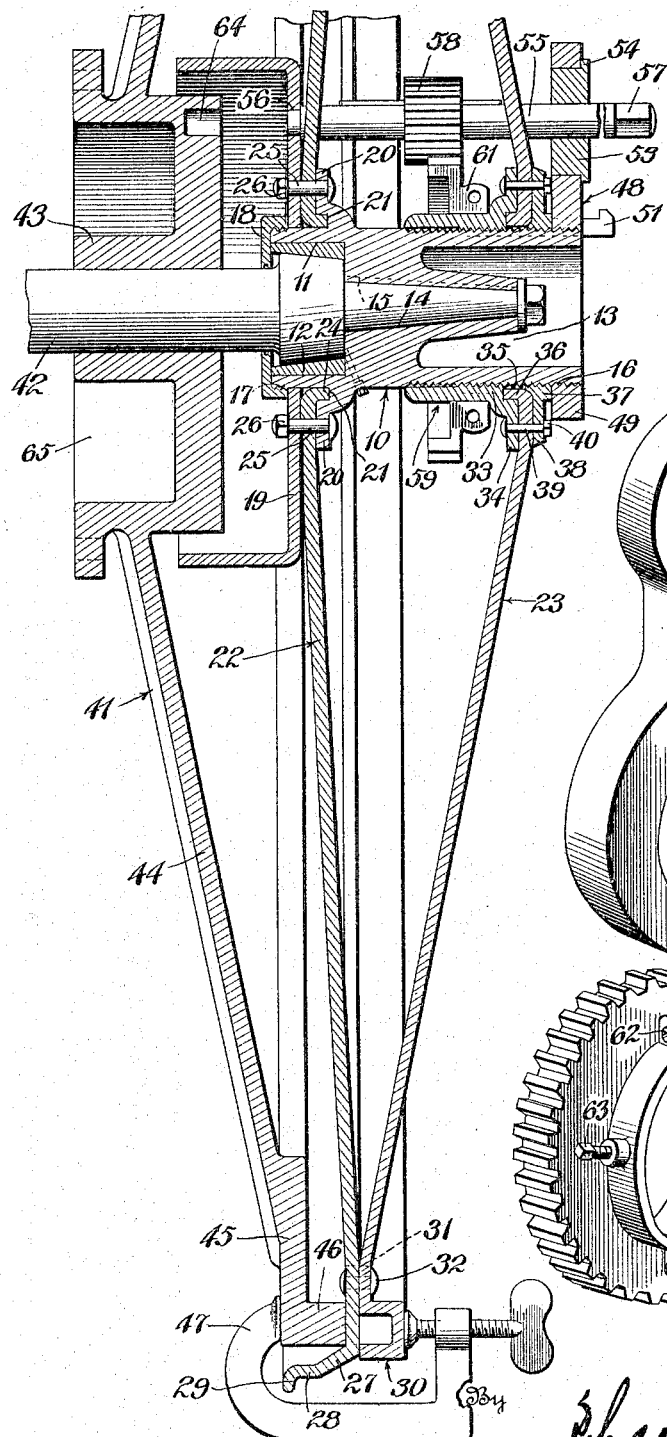
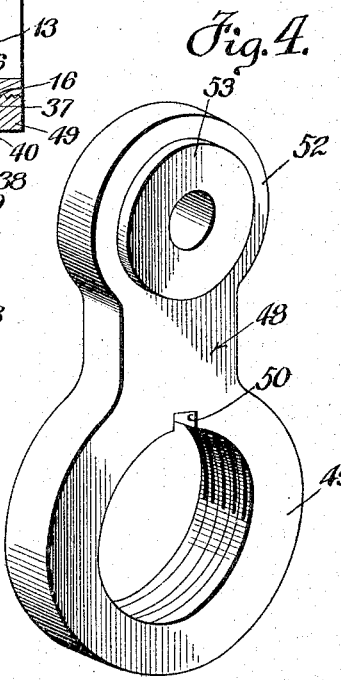
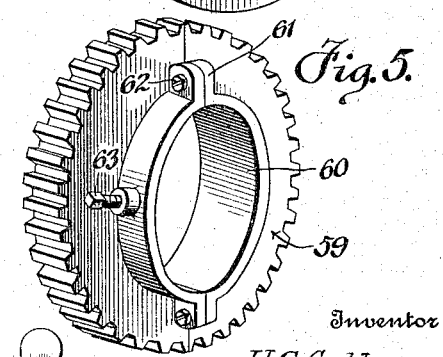
Inventor
H. C. Calhoun.

H. C. CALHOUN.
EXPANDER FOR WHEELS.
APPLICATION FILED SEPT. 20, 1916.
1,226,638.
Patented May 22, 1917.
2 SHEETS—SHEET 2.
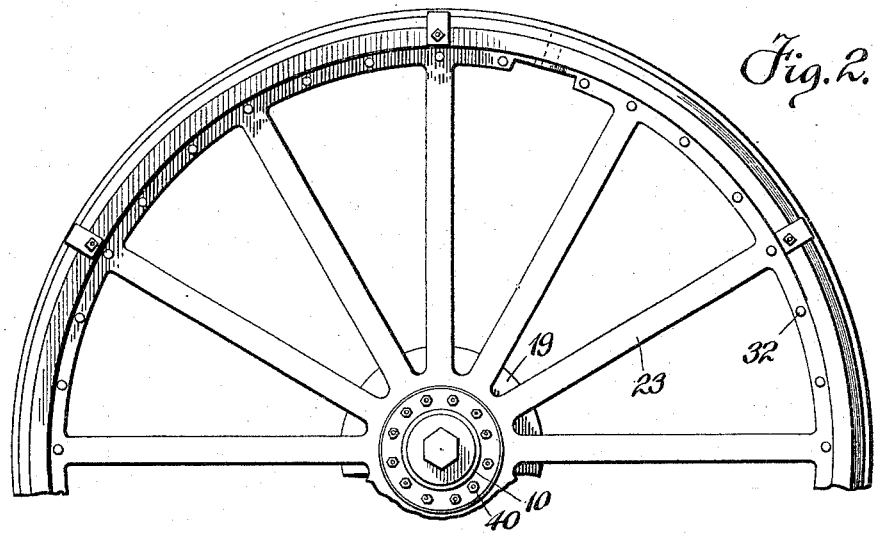
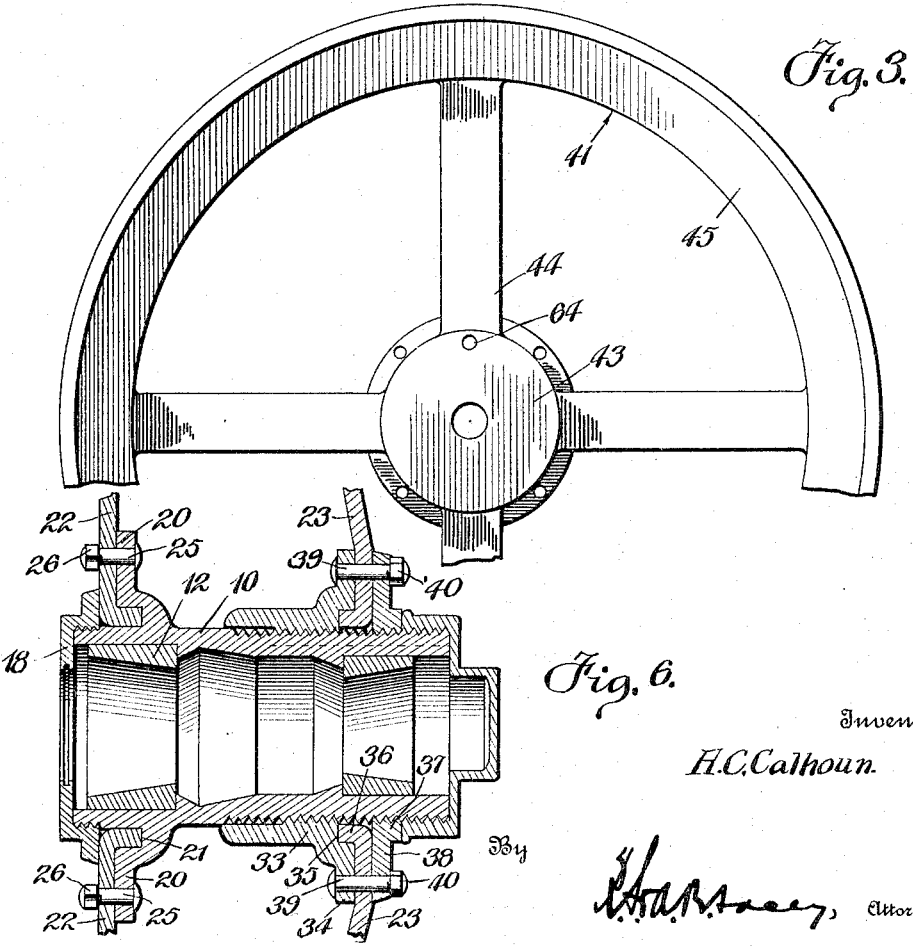
Inventor
H.C.Calhoun.
By
Attorneys.

UNITED STATES PATENT OFFICE.

HENRY C. CALHOUN, OF DETROIT, MICHIGAN.

EXPANDER FOR WHEELS.

1,226,638.     Specification of Letters Patent.     Patented May 22, 1917.

Application filed September 20, 1916. Serial No. 121,242.

*To all whom it may concern:*

Be it known that I, HENRY C. CALHOUN, a citizen of the United States, residing at Detroit, in the county of Wayne and State of Michigan, have invented certain new and useful Improvements in Expanders for Wheels, of which the following is a specification.

My invention relates to new and useful improvements in wheels and more particularly in the method of and apparatus for their manufacture, the primary object of my invention being the provision of a suitable apparatus for manufacturing all metal expanded wheels of the type adapted to receive demountable rims.

One object of my invention consists in the construction or manufacture of a wheel having a hub cast in a single piece and the main body of the wheel formed of sheet metal of suitable weight including an inner wheel section and an outer wheel section, both of which centrally receive the hub and the peripheral edges of which are shaped and joined to form a demountable rim receiving felly.

In this connection, it should be noted that after the parts are partially assembled, the hub receiving portions of the inner and outer wheel sections are spread in order to properly tension the portions of such sections forming the wheel spokes and one of the objects of my present invention consists in the provision of a novel form of apparatus for accomplishing this spreading operation.

Another object which I have in view is the provision of a wheel supporting jig and spreading mechanism of such a nature that the wheel may be readily removed from it when finished and in such a manner that a partially assembled wheel may be readily applied thereto.

With these and other objects in view, my invention will be more fully described, illustrated in the accompanying drawings, and then specifically pointed out in the claims which are attached to and form a part of this application.

In the drawings:

Figure 1 is a fragmentary radial section of a wheel constructed in accordance with my invention, the same being shown mounted upon my improved jig with the spreading apparatus applied;

Fig. 2 is a fragmentary side elevation of the wheel;

Fig. 3 is a corresponding view of the jig;

Fig. 4 is a perspective view of a thrust bracket employed as part of the spreading mechanism;

Fig. 5 is a perspective view of a split gear collar also forming part of the spreading mechanism;

Fig. 6 is a longitudinal sectional view of a modified form of hub construction.

Corresponding and like parts are referred to in the following description and indicated in all the views of the drawings by the same reference characters.

The construction of the wheel itself is fully covered in a copending application filed by me September 20, 1916, and bearing the Serial No. 121,243 and need not be described in detail in this case which relates not to the construction of the wheel but to the manner of its manufacture and the apparatus employed in connection therewith. However, a slight description of the wheel construction is necessary for an understanding of this case.

My improved all metal wheel construction includes a substantially cylindrical hub 10 formed at one end with a cylindrical socket or recess 11 to receive the ball bearing ring 12 and at its other end with an annular recess 13 in which the spindle securing nut of a live axle section may seat, the portion between these recesses being formed with a reduced frusto-conical spindle receiving bore 14 having the usual keyway 15. The hub is threaded throughout a considerable portion of its length at one end, as shown at 16, and slightly threaded at its other end, as shown at 17. A combined retainer gland and lock nut 18 is threaded upon this latter end to engage against the body of a brake drum 19 and hold it in place, as will be apparent. This hub, adjacent the brake drum receiving end, is provided with a radially extending annular flange 20, the inner face of which is undercut to provide an annular channel 21 directly encircling the wheel hub.

The remainder of the wheel includes, broadly speaking, an inner wheel section 22 and an outer wheel section 23. Each of these sections is stamped from a single piece of sheet metal, preferably steel, and each section has its annular central portion and annular felly forming portion connected by radial spokes. The annular central portion of the wheel is formed with an opening of proper size to receive the hub and this opening is surrounded by a flange 24 which seats within the channel or groove of the hub flange 20 to which it is secured by bolts 25 passed through the brake drum, inner wheel section 22 and flange 20 and secured by nuts 26. The outer peripheral edge or felly forming portion of the inner wheel section 22 is outbent to provide an inner frusto-conical portion 27 and a cylindrical rim seat forming portion 28 having a marginal outwardly directed rim retaining flange 29.

The felly forming portion of the other section 23 of the wheel is rebent upon itself to provide with that portion of the felly forming ring of the inner wheel section adjacent the portion 27 thereof, an annular tubular felly proper 30 square in cross section with its outer face concentric with but spaced within the outer face of the cylindrical portion 28. These felly forming portions are welded for a distance, as indicated in dotted lines at 31 in Fig. 1, and are also secured by rivets 32 passed through the sections at spaced peripheral intervals.

Threaded upon the outer end of the hub 10, is a spreader ring 33 having a radial flange 34 undercut to provide an annular channel 35 directly about the hub and the hub receiving portion of the outer wheel forming section 23 is formed with an annular flange 36 to seat within this channel. A locking ring 37 is threaded upon the hub and has an annular flange 38 to engage the outer face of the wheel forming section 23 to clamp such section between it and the flange of the spreader ring 33. These flanges and the section 23 are formed with alined bolt receiving openings to receive bolts 39 having nuts 40 in order that the parts may be locked together. Furthermore, these rings and the section 23 are provided with grooves or channels which, in assembled position of the parts, aline to provide a keyway which, together with a keyway formed in the hub, receives a key by means of which the various rings are locked against turning movement.

In the manufacture of the above described wheel, the hub, inner wheel forming section 22 and brake drum 19 are assembled and secured by the bolts 25 and nuts 26. The spreader ring 33 is then threaded upon the hub to a point substantially intermediate the length of the hub, the outer wheel forming section 23 is applied and turned in such a manner as to bring its spokes in line with the spokes of the inner wheel forming section 22 and the thus partially assembled wheel is mounted upon a jig indicated as a whole by the numeral 41. This jig includes a main shaft 42 suitable for connection with the hub of the wheel and in turn journaled in a jig hub 43 having radial spokes 44 which extend outwardly at an angle toward the free end of the shaft 42 and connect to an annular ring or rim 45 having an outwardly directed annular flange 46 of such proportions that when the wheel hub is mounted upon the shaft 42, the flange will seat within the frusto-conical portion 27 of the inner wheel forming section 22 and be slightly spaced therefrom. The partially assembled wheel is secured to the rim portion of this jig by a plurality of peripheral spaced clamps 47 and while held in this position openings are drilled through the inner and outer wheel forming sections 22 and 23 adjacent the felly to receive the rivets 32. As these openings are drilled, bolts are passed through them to keep the parts in proper alinement and when the openings have been drilled completely about the wheel in the manner above described, the wheel is removed from the jig with the bolts still in place. The bolts are then removed, a portion at a time, and replaced by rivets which are headed over to properly secure the parts together. After these rivets have been all applied, the portions of the sections 22 and 23, adjacent the felly, are welded to insure a close and secure joint, the rivets serving to prevent distortion of the parts during this welding.

When this much has been accomplished, the still unfinished wheel is again placed on the jig and is now in shape to have the hub receiving portions of its inner and outer sections 22 and 23 spread from each other to properly tension the spokes. The locking ring 37 is threaded onto the free end of the hub to the position which it should occupy when the wheel is completed and a thrust bracket 48 is applied. This bracket includes an annular body portion 49 internally threaded for engagement about the end of the hub 10 and having a keyway 50 adapted to aline with the keyway of the hub and locking ring to receive a temporary key 51 by which the bracket and locking ring may be held against turning movement. Extending radially from the body of this bracket is the thrust head 52 which is provided with an opening to receive the cylindrical thrust block 53, inward movement of which is limited by the annular stop shoulder 54. This thrust block journals a shaft 55, the inner end of which is reduced and journaled in an opening 56 formed in the body of the brake drum 19 and the outer end of which is squared, as shown at 57, to receive a socket wrench or other suitable tool by means of which it may be turned. This shaft 55 carries an elongated pinion 58 which meshes with a split gear ring 59 fixed to the spreading ring 33. This gear ring is formed in two symmetrical sections, each having a laterally directed semi-circular flange 60 terminating at its ends in radial clamping ears 61. These flanges are adapted to encircle the spreader ring and the gear ring is clamped about the spreader ring by means of clamping bolts 62 passed through the ears. The spreading ring, at one point, is provided in its outer face with a socket and a set bolt 63 is threaded through one of the flanges 60 to engage at its inner end in the socket and securely lock the gear ring against turning upon the spreading ring.

With the spreading apparatus applied, as above described, it will be clear that the spreading ring may be threaded outwardly along the hub to force the sections 22 and 23 of the wheel away from each other until the section 23 is brought into engagement with the locking ring 37 when the bolts 39 and nuts 40 may be applied. The split gear ring is then removed, the key 51 is withdrawn and the thrust bracket 48 and shaft 55 are removed. This is rendered possible by withdrawing the thrust block 53 and then drawing the shaft 55 and its pinion through the opening in the bracket, after which the bracket may be readily removed from the hub. A permanent key is then introduced in the keyway previously occupied by the key 51 and this permanent key also extends into a keyway formed in the spreading ring 33. Preferably, this latter ring is provided in several keyways so that the key may be applied without undue shifting of the spreading ring after the wheel is once spread.

In Fig. 6 of the drawings, I have illustrated a somewhat modified form of hub construction suitable for the front or steering wheels of motor vehicles but as the differences in construction are solely in the arrangement of spindle bearings no description is believed to be necessary and the corresponding parts are given the same numerals as in the form of hub shown in Fig. 1.

It should be noted that the key securing the pinion 58 to the shaft 55 and the shaft are of such length that when forming a front wheel upon the jig which, of course, has no brake drum, the reduced end of the shaft 55 may be journaled in a bearing socket 64 formed in the hub of the jig. This necessitates the formation of a relatively thick hub, but the hub may be lightened by recessing its outer face, as shown at 65.

Having thus described the invention, what is claimed as new is:

1. The method of forming all metal wheels which consists in mounting a pair of disk-shaped inner and outer wheel forming members upon a hub, anchoring one of said members to the hub adjacent one end thereof, securing the peripheral portions of the members together, and then forcing the central portion of the unanchored member outwardly and away from the corresponding portion of the anchored member.

2. The method of forming all-metal wheels, which consists in mounting a pair of disk-shaped inner and outer wheel forming members upon a hub, anchoring one of said members to the hub adjacent one end thereof, welding the members together adjacent their peripheral edges, and then forcing the central portion of the unanchored member outwardly and away from the corresponding portion of the anchored member.

3. The method of forming all-metal wheels, which consists in mounting a pair of disk-shaped inner and outer wheel forming members upon a hub, anchoring one of said members to the hub adjacent one end thereof, riveting and welding the members together near their peripheral edges, and then forcing the central portion of the unanchored member outwardly and away from the corresponding portion of the anchored member.

4. The method of forming all-metal wheels, which consists in mounting a pair of disk-shaped inner and outer wheel forming members upon a hub, anchoring one of said members to the hub adjacent one end thereof, drilling a series of alined concentric rivet receiving openings through the members adjacent their peripheral edges and securing the members by bolts passed through such openings and provided with nuts as the openings are drilled, successively removing the bolts and replacing them by rivets, welding the members together adjacent their point of riveted connection, and then forcing the central portion of the unanchored member outwardly and away from the corresponding portion of the anchored member.

5. The method of forming all-metal wheels, which consists in forming the peripheral edges of a pair of disk-shaped inner and outer wheel forming members, whereby when such edge portions are secured together a demountable rim receiving felly will be formed, mounting the members upon a hub, anchoring one of the members to the hub, securing the peripheral portions of the members together to form the felly, and then forcing the central portion of the unanchored member outwardly and away from the corresponding portion of the anchored member.

6. The method of forming all-metal wheels, which consists in forming the peripheral edges of a pair of disk-shaped inner and outer wheel forming members, whereby when such edge portions are secured together a demountable rim receiving felly will be formed, mounting the members upon a hub, anchoring one of the members to the hub, securing the peripheral portions of the members together to form the felly, and then securing such previously unanchored member to the hub.

In testimony whereof I affix my signature.

HENRY C. CALHOUN. [L. S.]

Copies of this patent may be obtained for five cents each, by addressing the "Commissioner of Patents, Washington, D. C."